(12) United States Patent
Faulmann et al.

(10) Patent No.: US 7,513,927 B2
(45) Date of Patent: Apr. 7, 2009

(54) METHODS OF CONTROLLING CHEMICAL SELF-HEATING OF ORGANIC-CONTAINING MATERIALS

(75) Inventors: Ervin L. Faulmann, Toledo, OH (US); Jeffrey C. Burnham, Naples, FL (US)

(73) Assignee: VitAG, LLC, Beech Island, SC (US)

( * ) Notice: Subject to any disclaimer, the term of this patent is extended or adjusted under 35 U.S.C. 154(b) by 986 days.

(21) Appl. No.: 10/738,983

(22) Filed: Dec. 19, 2003

(65) Prior Publication Data

US 2008/0000279 A1    Jan. 3, 2008

(51) Int. Cl.
| | |
|---|---|
| C05B 11/04 | (2006.01) |
| C05B 11/08 | (2006.01) |
| C05C 9/00 | (2006.01) |
| C05D 9/00 | (2006.01) |
| C05F 3/00 | (2006.01) |
| C05F 5/00 | (2006.01) |
| C05F 7/00 | (2006.01) |
| C05F 9/00 | (2006.01) |

(52) U.S. Cl. .................. 71/11; 71/12; 71/25; 71/27; 71/28; 71/29; 71/30

(58) Field of Classification Search .............. 71/12, 71/11, 25, 27–30
See application file for complete search history.

(56) References Cited

U.S. PATENT DOCUMENTS

| | | |
|---|---|---|
| 3,655,395 A | 4/1972 | Karnemaat |
| 3,939,280 A | 2/1976 | Karnemaat |
| 3,942,970 A | 3/1976 | O'Donnell |
| 4,154,593 A | 5/1979 | Brown et al. |
| 4,304,588 A | 12/1981 | Moore, Jr. |
| 4,519,831 A | 5/1985 | Moore, Jr. |
| 4,743,287 A | 5/1988 | Robinson |
| 5,238,480 A | 8/1993 | Rehberg et al. |
| 5,275,733 A * | 1/1994 | Burnham ............ 210/609 |
| 5,417,861 A * | 5/1995 | Burnham ............ 210/609 |
| 5,443,613 A * | 8/1995 | Robinson .............. 71/12 |
| 5,466,273 A | 11/1995 | Connell |
| 5,984,992 A | 11/1999 | Greer et al. |
| 6,159,263 A | 12/2000 | Greer et al. |
| 6,398,840 B1 | 6/2002 | Orta-Castro |
| 6,406,510 B1 | 6/2002 | Burnham |
| 6,409,788 B1 * | 6/2002 | Sower .................. 71/11 |

(Continued)

FOREIGN PATENT DOCUMENTS

EP    0143392    6/1985

(Continued)

*Primary Examiner*—Timothy C Vanoy
*Assistant Examiner*—Serena L Hanor
(74) *Attorney, Agent, or Firm*—Novak Druce & Quigg, LLP

(57) ABSTRACT

Disclosed herein are methods of inhibiting chemical self-heating in organic-containing materials by the addition of phosphate and or other buffering agents which control the pH of the organic-containing material and alter the organic nature of the material such that self-heating reaction is inhibited, and fertilizer produced by these methods. Also disclosed are methods for producing an improved, i.e., self-heating resistant, organically-enhanced inorganic fertilizer and methods for improving the management of soil pH and the interaction of fertilizers with the soil and associated agricultural crops.

38 Claims, 3 Drawing Sheets

U.S. PATENT DOCUMENTS

| | | |
|---|---|---|
| 6,409,789 B1 | 6/2002 | Gilbert |
| 6,461,399 B1 | 10/2002 | Connell |
| 6,623,650 B2 * | 9/2003 | Millard ............... 210/764 |
| 6,666,154 B2 * | 12/2003 | Logan et al. ............ 110/346 |
| 6,752,848 B2 | 6/2004 | Logan |
| 6,752,849 B2 * | 6/2004 | Logan et al. ............... 71/11 |
| 6,758,879 B2 | 7/2004 | Greer et al. |
| 6,841,515 B2 * | 1/2005 | Burnham ............... 504/102 |
| 6,852,142 B2 | 2/2005 | Varshovi |
| 7,128,880 B2 | 10/2006 | Dahms et al. |
| 2003/0089151 A1 * | 5/2003 | Logan et al. ............... 71/11 |
| 2004/0065127 A1 | 4/2004 | Connell |
| 2004/0120867 A1 | 6/2004 | Dahms et al. |
| 2004/0177664 A1 | 9/2004 | Hale |
| 2005/0039508 A1 | 2/2005 | Burnham |
| 2006/0243009 A1 | 11/2006 | Burnham |
| 2006/0254331 A1 | 11/2006 | Burnham |
| 2007/0062233 A1 | 3/2007 | Burnham |
| 2007/0257715 A1 | 11/2007 | Semerdzhiev |

FOREIGN PATENT DOCUMENTS

| | | |
|---|---|---|
| EP | 0 557 078 A1 | 8/1993 |
| EP | 0557078 | 8/1993 |
| FR | 2 133 115 | 11/1972 |
| FR | 2133115 | 11/1972 |
| FR | 2757504 | 6/1998 |
| JP | 58032638 | 2/1983 |

* cited by examiner

| Stage I Heating | Stage II Heating | Stage III Heating | Stage IV Heating |
| --- | --- | --- | --- |
| Ambient—> | 160°F (71°C)—> | 212°F (100°C)—> | 500°F (260°C)—> |
| Manufacturing heat<br>Ammonia/amine reaction with H+<br>Microbial heating (not found) | Ammonia/amines reaction with H+<br>Organic oxidation heating | Ammonia/amines reaction with H+<br>Organic oxidation heating<br>Hydration heating | Wood accelerant |

Figure 1

METHODS OF CONTROLLING CHEMICAL SELF-HEATING OF ORGANIC-CONTAINING MATERIALS

FIELD OF THE INVENTION

This invention relates to methods of preventing or minimizing the development of chemical self-heating or spontaneous combustion which can occur in organic-containing materials. More specifically, this invention relates to methods of preventing or minimizing self-heating which can occur in dried organic materials such as granules or pellets when these are stored, especially for lengthy periods of time.

BACKGROUND

Biosolids or sludges are the solid component of treated wastewater commonly produced by municipalities and industry. Dried biosolid-containing materials are increasingly being produced as a means of converting municipal biosolids or sludges into materials which may beneficially be used for soil conditioning or agricultural fertilizers. These materials are usually formed into granules, pellets, grains, particles, extrusions or other forms with dryness exceeding 80%, and more often, exceeding 95%. When these materials are statically stored in dry ambient conditions, especially in large bulk quantities, cooling that would counter the chemical self-heating can be prevented by the thermal insulation properties of the stored material. Consequently, these materials can slowly chemically self-heat to temperatures commonly exceeding 400° F. (204° C.).

The term organically-enhanced inorganic fertilizer refers to any inorganic fertilizer that is combined with organic materials, such as biosolids, to form a fertilizer. The organic materials can be combined with the inorganic materials prior to, during or after the formation of the inorganic fertilizer.

Chemical self-heating occurs commonly in stored dried biosolids pellets as processed from many municipalities wastewater biosolids or sludges. A material that has experienced some chemical self heating upon long term storage, but significantly less than experienced by dried biosolids that do not contain any major inorganic component, is an organically-enhanced inorganic fertilizer that is described in U.S. Pat. Nos. 5,984,992 and 6,159,263. These patents describe an organically enhanced inorganic fertilizer made by reacting concentrated sulfuric acid with anhydrous ammonia, while adding fluidized municipal biosolids, ostensibly as an agent to cool the reaction of the concentrated acid and base. The material is then granulated, dried, sized and treated with various hardening and de-dusting agents. The resulting product is a dried (98-99.5% solids) granular material that is agriculturally valuable as an ammonium sulfate fertilizer and also contains organic compounds contributed by the biosolids.

SUMMARY OF THE INVENTION

It was surprisingly discovered that chemical self-heating of bulk quantities of fertilizer can be substantially prevented. Disclosed herein are methods of inhibiting chemical self-heating in organic-containing materials by the addition of phosphate and or other buffering agents which control the pH of the organic-containing material and alter the organic nature of the material such that self-heating reaction is inhibited. Also disclosed are methods for producing an improved, i.e., self-heating resistant, organically-enhanced inorganic fertilizer and methods for improving the management of soil pH and the interaction of fertilizers with the soil and associated agricultural crops.

One embodiment of the invention is directed to methods of controlling self-heating in an organic-containing material. The method includes providing an organic-containing material in which the pH of the material changes as the material is chemically self-heated, and adding a buffer to the organic-containing material to minimize the chemical self-heating within the material.

Preferably, the organic-containing material is an organically-enhanced inorganic fertilizer that includes an ammonium salt and biosolids and is in a granule, pellet, extrusion, grain or particle form. Preferred buffers include mono- and dibasic-phosphate salts, metal carbonates, other carbonates, bicarbonates, phthalates or citrates. Preferably, the organic-containing material has a dryness exceeding 80% by weight.

Preferably, the amount of buffer added to the organic containing material is between 0.1 wt. % and 50 wt. % of the dry mass of the total material. The pH of organic-containing material after the addition of the buffer is maintained between pH 5.0 and pH 9.0, allowing large quantities of the material to be stored safely for over 14 days.

Another embodiment of the invention is directed to organically-enhanced inorganic fertilizers. The fertilizer includes an organic component, an inorganic component; and a buffer. Preferably, the organic component includes biosolids, the inorganic component includes an ammonium salt and the buffer is a mono- or dibasic-phosphate salt, metal carbonate, other carbonate, bicarbonate, phthalate, citrates or other organic buffer.

The fertilizer maintains its manufacturing pH during storage. Allowing over 10 tons of the material to be safely store for 14 days or more.

DESCRIPTION OF THE DRAWINGS

The invention will be better understood by reference to the Detailed Description of the Invention when taken together with the attached drawings, wherein:

FIG. 1 depicts the four stages of the chemical reactions that occur in organically-enhanced inorganic fertilizers relative to the temperature of the material;

DESCRIPTION OF THE INVENTION

Figure 2:
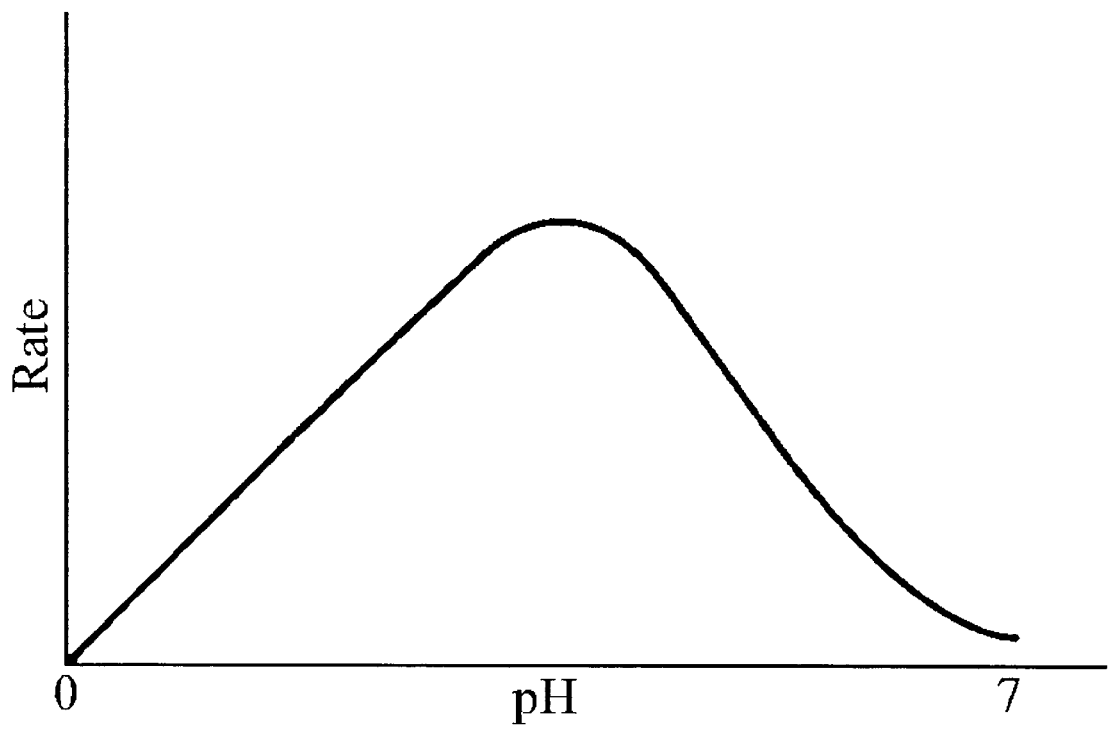
FIG. 2 is a graph of the rate of condensation of an ammonia derivative with a carbonyl compound as a function of pH.

Many organic-containing materials that are stored in bulk can chemically self-heat. Specifically, organically-enhanced inorganic fertilizers, have been observed to undergo chemical self-heating because the presence of organic molecules in this material that can oxidize along with a combination of chemicals in these fertilizers that can exothermically react. Fertilizers that contain biosolids material are especially prone to the chemical self-heating phenomenon primarily through an oxidation of the organics in the biosolids present leading to an accumulation of heat in an insulated storage environment such as a large volume bulk storage pile in a warehouse.

Preferred organically-enhanced inorganic fertilizer materials are described in detail in U.S. Pat. Nos. 5,984,992 and 6,159,263. However, one of ordinary skill in the art will recognize that that the methods for controlling chemical self-heating described herein can be applied to other organically-enhanced inorganic or organic-containing fertilizers as well as other as organic-containing materials in a variety of forms that experience chemical self heating.

Organically-enhanced inorganic fertilizers described herein may contain inorganic fertilizer materials such as ammonium salts, including ammonium sulfate, mono- and di-ammonium phosphates, ammonium nitrate and urea, and/or carbonates, including calcium carbonate or sodium carbonate or potassium carbonate in addition to organic materials.

A recurring problem in the manufacture and storage of dried organic-containing materials is that when stored bulk small pockets of "chemical heating", (also referred to as "spontaneous heating" or spontaneous combustion" and "self-heating") material can develop over time. Bulk quantities are known in the art and refer to quantities commonly found during the manufacturing and distribution processes. Bulk amounts of organic-containing materials are often, for example, over 10 tons, over 100 tons or over 1000 tons and can be over 2000 tons.

Preferably, the organic material is dried before storing and is in a granule, pellet, extrusion, grain, particle or other dried form. Preferably, the organic material has a dryness exceeding 80% by weight, more preferably exceeding 95% by weight and most preferably exceeding 98% by weight.

The organic-containing material may be stored in a storage facility for a long period of time before being used (e.g. days, weeks, months). Preferably, the product is stored for at least 14 days or more, 30 days or more, 60 days or more, 90 days or more, 120 days or more, 150 days or more 180 days or more, or a year or more.

This chemical heating can spread throughout much of the pile, developing temperatures of over 500° F. (260° C.). Though the heated organic-containing material itself in organically-enhanced inorganic fertilizers may not be flammable at these temperatures, elevated temperatures in large storage piles can lead to product smoldering, increased odor problems, flammability of other materials (e.g. wooden storage bin dividers), and worker safety issues.

In piles of organically-enhanced inorganic fertilizer, regions of heated product can form areas of 'fused-granules' where the material is agglomerated into areas hard to break apart. This self-heating phenomenon most often occurs in areas very deep in the pile (where oxygen for normal oxidation may be scarce).

Further, it has been found that the self-heating phenomenon is not observed in organically-enhanced inorganic fertilizers made from granular ammonium sulfate or ammonium phosphate material made without added organics. Accordingly, the chemical self heating is directly related to the presence of organic material, and the presence of organic material in combination with chemicals present in inorganic fertilizers, the reaction of which may contribute to the self-heating process.

The self-heating reaction occurs in stages related to the specific chemical reaction occurring in the organic-containing material, the time of storage and the temperatures reached. FIG. 1 shows the four stages of the chemical reactions that occur in organically-enhanced inorganic fertilizers relative to the temperature of the material. The self heating phenomenon occurs in Stages II and III of FIG. 1.

The pKa (the pH where the molecule is uncharged) of ammonium sulfate is 6.0. A preferred organically-enhanced inorganic fertilizer product is manufactured so that the pH of the material is also 6.0 (therefore unchanged). It has been consistently found that the pH of stored organically-enhanced inorganic fertilizers decreases over time and that material from self-heating regions (those regions in Stage II and III of FIG. 1) can be below pH 4.0.

Acid may exist in organic materials from a variety of sources. For example, in organically-enhanced inorganic fertilizer products acids may be present in the product from sources such as: 1) the manufacturing process, which may leave excess sulfuric acid in the material; 2) biosolids in the fertilizer, which may contain acids; and, 3) acids may arise from an equilibrium set up in the product involving ammonium sulfate, which is typically present in inorganic fertilizers.

Acids can be produced from ammonium sulfate according to the following equilibrium Equations 1-3:

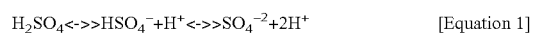
$$H_2SO_4 <\text{-}>> HSO_4^- + H^+ <\text{-}>> SO_4^{-2} + 2H^+ \quad \text{[Equation 1]}$$

$$R-COOH <\text{-}> R-COO^- + H^+ \quad \text{[Equation 2]}$$

$$(NH_4)_2SO_4 <\text{-}> H_2SO_4 + 2NH_3 \quad \text{[Equation 3]}$$

Ammonium sulfate in organically-enhanced inorganic fertilizers typically exists in both ionic and uncharged forms in equilibrium in the material. The sulfuric acid and the ammonia formed in this equilibrium can further dissociate. Instead of off-gassing, the ammonia can immediately become an electron acceptor and convert to an ammonium ion as shown in Equation 4.

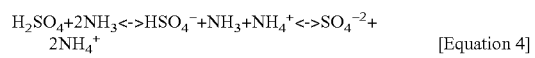
$$H_2SO_4 + 2NH_3 <\text{-}> HSO_4^- + NH_3 + NH_4^+ <\text{-}> SO_4^{-2} + 2NH_4^+ \quad \text{[Equation 4]}$$

This equilibrium is balanced and, due to the strong acid nature of the sulfate, most of the material is in the most ionic form ($SO_4^{-2}$). However, there is a small percentage of the molecules in either of the other states containing free ammonia ($NH_3$). Each of the free ammonia molecules exists in a form that has unpaired electrons as shown in Equation 5:

[Equation 5]

In this form the ammonia molecule can act as a nucleophile (be reactive with atoms in other molecules that have some of their electrons attracted to other atoms within the molecule). In organically-enhanced inorganic fertilizer products containing ammonium sulfate, this is inconsequential, as the free ammonia readily equilibrates into the ionic form. The added organics in the product can be reactive with nucleophilic molecules (e.g., carbonyl-containing organics) that can react with the free ammonia according to Equation 6:

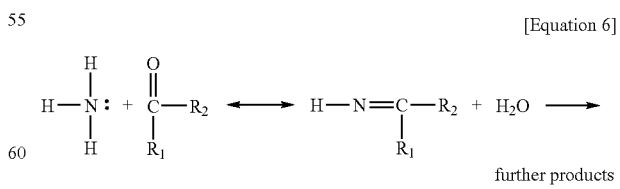

[Equation 6]

further products

The reaction shown in Equation 6 (known as 'condensation with ammonia') can generate molecules containing reactive N=C bonds through the formation of a number of relatively unstable intermediate molecules. The molecules with the reactive N═C bonds can then go on to form more stable products through exothermic reactions that result in the release of energy and the generation of heat. This condensation process thus removes free ammonia from the equilibrium in Equation 4, leaving an excess of the various sulfate ions and leading to a decreased pH of the resulting material.

Equation 6 is subject to acid catalysis (acid greatly enhances the reaction) and the kinetics are extremely pH dependent. FIG. 2 shows how the reaction rate fluctuates with the pH of the material. The water produced in the reaction has the potential to interact with the sulfuric acid molecules, releasing heat (heat of hydration). The accumulation of concentrated sulfuric acid in the presence of water can facilitate the hydrolysis of C—N and C—C bonds present in the organic compounds of the organically-enhanced inorganic fertilizer releasing even more heat.

The reaction of free ammonia with electrophilic molecules can lead to a modest release of heat. This low-level generation of heat may be one of the factors that contributes to the initial slow rise in temperature of stored organically-enhanced inorganic fertilizer products. The potential of the localized sulfuric acid and water hydrolysis of C—N and C—C bonds may be important in later stages of the self-heating phenomenon in which the pH is lower and the heat generated in the pile is much greater.

Equations 1-6 listed above show that there is a strong relationship between a decrease in pH and the elevated temperatures of organic-containing products. Additionally, Stage 2 of the self-heating reaction shown in FIG. 1 is a relatively slow process.

Several additional observations that are consistent with the chemical mechanisms outlined in Equations 1-6 are as follows:

a. The pH of the organically-enhanced inorganic fertilizer continues to decrease following manufacture.
b. The pH of self-heated organic-enhanced inorganic fertilizer is further decreased (to acid).
c. Ammonium sulfate granules (containing no organics) do not self heat.
d. The self-heating reaction appears to involve the release or formation of water, which may cause some of the moisture effects observed in the product (clumping and fusing).
e. Dry stored organically-enhanced inorganic fertilizer granules that have not been associated with a heating event do not exhibit any clumping or fusing.

After determining that a decrease in pH is associated with the chemical self-heating phenomenon that occurs in organic-containing materials, and specifically organically-enhanced inorganic fertilizers, it was determined that the self-heating can be controlled by controlling the pH of the organic-containing materials.

Control of pH in the organic-containing material by buffering, preferably with phosphate buffers, is the preferred method of controlling the pH. By maintaining a balanced pH during storage, the acid catalysis reactions and the optimal pH needed for the ammonia condensation reaction can be limited. Adding buffering materials to organic-containing materials can limit the effect of the acid catalysis reactions and thus the self-heating reactions of organic-containing materials during storage.

Preferred buffering agents added to the organic-containing materials include mono- and dibasic-phosphate salts, metal carbonates such as ($CaCO_3$, $MgCO_3$, $Fe_2(CO_3)_3$, $Al_2(CO_3)_3$ etc.), other carbonates and bicarbonates, phthalates, citrates and other organic buffers. Also preferred are various by-products that contain these phosphates and carbonates.

The addition of these buffering agents can interfere with the equilibrium of acid-creation illustrated in Equations 1, 2, 3, 4 and therefore help stop the acid-related self-heating reactions.

The effective amount of buffer is that amount which prevents unwanted self-heating of organic-containing material, which is especially problematic when such materials are stored in bulk. Preferably, the effective amount of buffer is between 0.1% and 50% of the dry mass of the total material. More preferably, between 0.5% and 10% and most preferably, between 1% and 5% of the dry mass of the total material. Preferably, the pH of the organic-containing material and buffer mixture is between pH 5 and pH 9, more preferably, between pH 5.5 and pH 8.0, and most preferably between pH 5.9 and pH 7.2. The aim of adding the buffering agent is to maintain pH of the product near neutrality, as an alkaline pH would facilitate the formation and release of free ammonia (NH3).

The pH of the buffered material preferably does not change over time when stored. Changes in pH of less than 1.0, more preferably less than 0.75, and most preferably, less than 0.5 can be achieved by the addition of the buffering agent.

If monobasic potassium phosphate is used a buffering agent in an organically-enhanced inorganic fertilizer, the buffering reaction is shown in Equation 7 would take the form of:

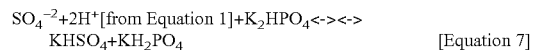
[Equation 7]

Such a reaction should have the effect of buffering the pH of the mixture.

If calcium carbonate is used as a buffering agent, the buffering reaction is shown in Equation 8:

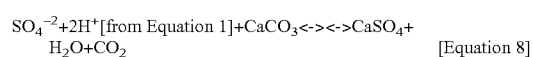
[Equation 8]

Though not complete in their potential for stopping the reaction of Equation 6, these buffering agents can slow the kinetics of the reaction (see FIG. 2) and thus the rate of low-level heat liberation (Stage 2) such that any heat generated would have a better chance of radiating from the storage pile rather than building up the self-heating of the pile.

Additionally, neutralizing the excess sulfate ions that result from any free ammonia lost in the system using $CaCO_3$ or other buffering agents can also limit the acid hydrolysis of stable covalent bonds in the organic molecules. Use of calcium buffers would yield $CaSO_4$ (gypsum) (see Equation 8) as the salt formed in the neutralization of sulfuric acid and which is the stable form of the sulfate.

The relatively small amount of buffering agent needed too control the pH of the organic-containing material can be seen in Table 1 in which an organically-enhanced inorganic fertilizer (stored approximately 5 months) was hydrated and the pH of the solution was determined after the addition of pure calcium carbonate.

TABLE 1

Effect of Calcium Carbonate Addition on the pH of Aged Organically-Enhanced Inorganic Fertilizer

| Amount of $CaCO_3$ added | pH |
| --- | --- |
| 0 | 4.54 |
| 1% | 6.20 |
| 2% | 6.47 |
| 3% | 6.64 |

The buffer helps control unwanted chemical self-heating of organic materials which is especially a problem when such materials are stored in bulk. Preferably, the temperature rise of any portion of the organic material is less than 100° F. (56° C.) over the ambient temperature. More preferably, less than 75° F. (42° C.) over the ambient temperature even more preferably less than 50° F. (28° C.) over the ambient temperature and most preferably less than 25° F. (14° C.) over the ambient temperature. Preferably, this rise in temperature can be held for at least 1 week, 2 weeks, a month, 2 months, 3 months, 4 months, 5 months 6 months or over a year.

Figure 3:
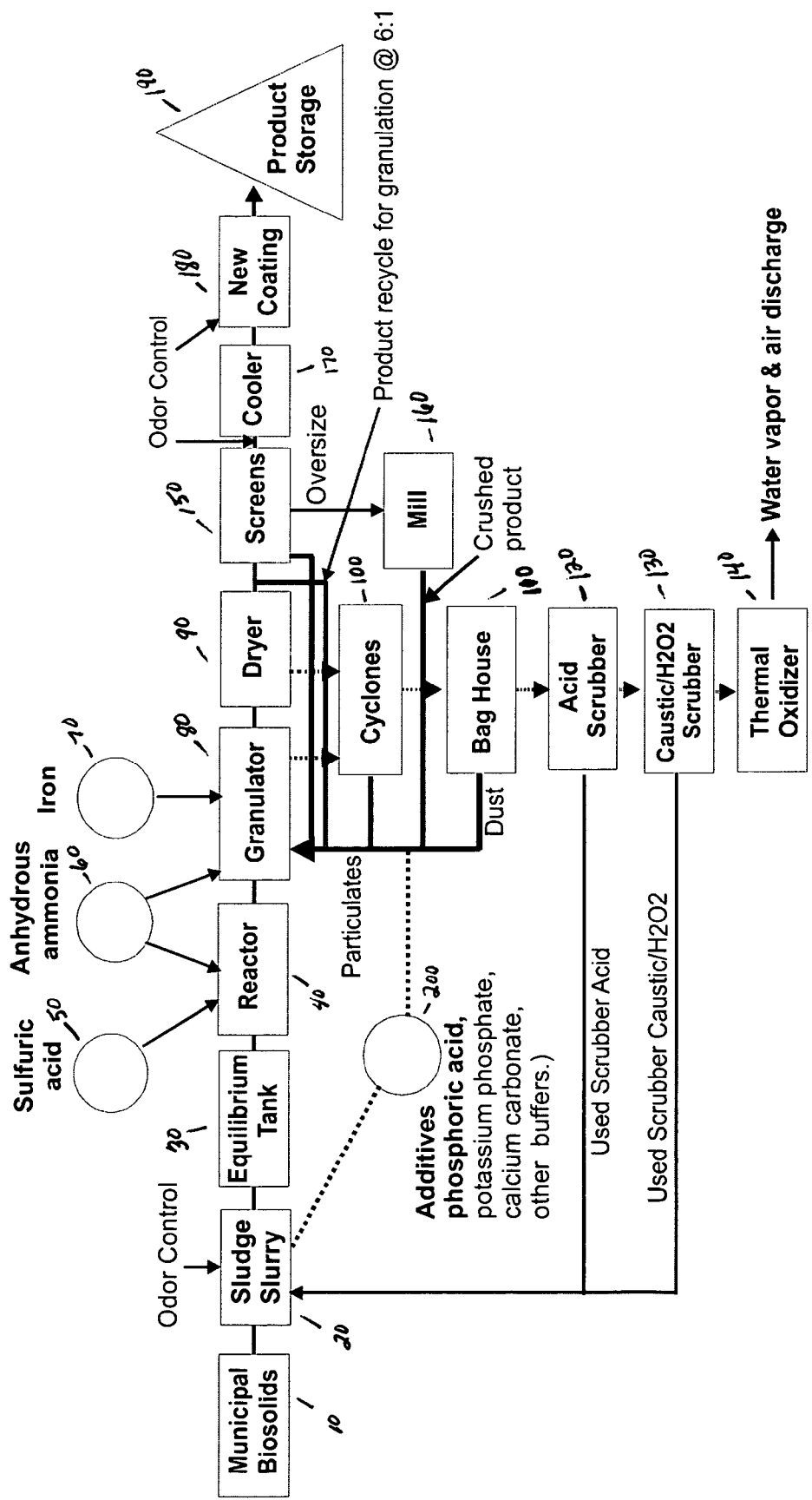
FIG. 3 diagrams a process for producing organically-enhanced inorganic fertilizer with a buffering agent that reduces chemical self heating.

FIG. 3 shows a process for producing organically-enhanced inorganic fertilizer with a buffering agent to reduce chemical self heating. In FIG. 3, municipal biosolids 10 are combined with scrubber water from acid scrubber 120 and caustic/$H_2O_2$ scrubber 130 to form sludge slurry 20. The sludge slurry 20 is then pumped into an equilibrium tank 30 before being directed into reactor 40. In reactor 40, the sludge is combined with sulfuric acid 50 and anhydrous ammonia 60 to form an organically-enhanced inorganic fertilizer. A preferred reactor is a pipe-cross reactor.

The organically-enhanced inorganic fertilizer from the reactor is sent to a granulator 80 where more anhydrous ammonia 60 and iron 70 is combined with the fertilizer. Dust and fumes from granulator 80 are sent to cyclones 100, bag house 110, acid scrubber 120, caustic scrubber 130 and then to thermal oxidizer 140.

From the granulator 80 the organically-enhanced inorganic fertilizer is sent to a dryer 90 and then to screens 150. Any organically-enhanced inorganic fertilizer that is to large is sent from the screens 150 to mill 160 and then back to granulator 80. After the organically-enhanced inorganic fertilizer has been screened, it is cooled in cooler 170, then coated 180 before being sent to a storage facility 190.

A buffering agent 200 can be added to the organically-enhanced inorganic fertilizer at any step in this process. However, it is preferred to add the buffering agent 200 to the manufacturing process at the point where the dust from bag house 110 and crushed product from mill 160 are recycled back to granulator 80.

By adding the buffering agent in the granulator, there would be no interference with the heat-generating reactions of the pipe-cross reactor. The initial pH of the material would most likely be higher than normal, however the pH of the organically-enhanced inorganic fertilizer material would decrease quickly to normal processing levels within the first 48 hours.

Preferred buffers for this process include phosphate compounds such as ammonium phosphate or calcium compounds such as calcium carbonate or aged alkaline admixtures like cement kiln dust or fly ash.

The addition of the buffer will have little negative impact on the resulting organically-enhanced inorganic fertilizer, yet provides product stability upon storage. For example, the addition of between 1% to 5% of buffering agent will not interfere with the registration of organically-enhanced inorganic fertilizer as a high nitrogen fertilizer. According to 2002 12-month average quality control data, the product can contain up to 15% phosphate or carbonate addition without reducing the nitrogen below its registered 16% value.

Further, phosphate 200, added as phosphoric acid directly to the sludge 20 prior to reaction with acid 50 and anhydrous ammonia 60, or as a phosphate salt prior to the fertilizer forming reaction, is combining with the organic molecules in the organic-containing material thereby inhibiting their oxidation. The reduction in organic oxidation inhibits the contribution of heat from the oxidation process to the self-heating phenomenon and increases the stability of the material or product. In addition to inhibiting the self heating phenomenon, the addition of the buffering agent to the product chemistry can benefit its fertilizer properties.

The following represent some of the characteristics of an organically-enhanced inorganic fertilizer:

1. The product is resistant to the self-heating phenomenon that was experienced with the old organically-enhanced inorganic fertilizer product upon prolonged storage in large piles.
2. If phosphate or carbonate is used as a buffer, the phosphate or carbonate in the product serves to interrupt the chemical equilibrium involving hydrogen ions and ammonia reactions with carbon compounds occurring in organic-containing granules.
3. The product is buffered for improved soil conditioning and pH control.
4. The product counters the acidification tendencies of traditional ammonium sulfate fertilizers.
5. The product will maintain the manufacturing pH of the fertilizer granule and not undergo continued acidification during storage.
6. The chemical modification in the product does not significantly affect the nutrient (NPKS) percentages in the granular fertilizer.
11. Utilization of the buffers during the manufacturing process can permit the use of ferric compounds in odor control scenarios with less concern about their role in catalyzing heating reactions.

The invention will be further clarified by the following examples, which are intended to be exemplary.

EXAMPLE 1

Municipal wastewater biosolids (sludge) cake was received by a fertilizer manufacturing plant with 28% solids and processed by a routine granulation methodology to create an organically-enhanced inorganic fertilizer. In this method, as taught by U.S. Pat. Nos. 5,984,992 and 6,159,263, the sludge cake was vigorously mixed in an agitator with an acidified ferric sulfate to yield a 2% iron concentration in the final fertilizer product.

Concentrated phosphoric acid (70% aqueous solution) was mixed into the acidified sludge to yield a 3% phosphate value by weight in the final product. After thorough mixing and aging, this material was pumped into a pipe-cross reactor where it was mixed with concentrated sulfuric acid and anhydrous ammonia sufficient to raise the temperature of the mixture to over 250° F. (121° C.) within the reactor. The mixture was then retained in the reactor at this temperature for over 10 seconds before it was discharged into a granulator.

The pH of the mixture was adjusted to pH 6.2 within the granulator by adding additional anhydrous ammonia directly into the granulator. The material was then granulated for approximately 4 minutes at 205° F. (96° C.). The granular discharge from the granulator was dried in a rotary dryer at 200° F. (93° C.) for over 10 minutes to over 98% solids. This process yields a hard granular product made up of 16-3-0-18 (N—P—K—S) fertilizer with a biosolids organic residual of about 25% by weight for the finished product that is resistant to organic self-heating during long term dry storage under ambient temperature conditions.

EXAMPLE 2

Municipal wastewater biosolids (sludge) cake was received by a fertilizer manufacturing plant with 28% solids and processed by a routine granulation methodology to create an organically-enhanced inorganic fertilizer. In this method, as taught by U.S. Pat. Nos. 5,984,992 and 6,159,263, the sludge cake was vigorously mixed in an agitator with an acidified ferric sulfate to yield a 2% iron concentration in the final fertilizer product.

After thorough mixing and aging this material was pumped into a pipe-cross reactor into which was injected an amount of concentrated sulfuric acid, concentrated phosphoric acid and anhydrous ammonia sufficient to raise the temperature of the mixture to over 250° F. (121° C.) within the reactor. The amount of phosphoric acid added directly to the pipe-cross reactor was sufficient to yield a 4% phosphate concentration in the final product. The mixture was retained in the reactor at this temperature for over 10 seconds before it was discharged into a granulator. The material was granulated in the granulator for over 4 minutes at 205° F. (96°). The pH of the mixture was adjusted to pH 6.2 within the granulator by adding additional anhydrous ammonia directly into the granulator.

The granular discharge from the granulator was dried in a rotary dryer operating at 200° F. (93° C.) for over 10 minutes to over 98% solids. This process yields a granular organically-enhanced inorganic fertilizer product made up of 16-3-0-18 (N—P—K—S) fertilizer with a biosolids organic residual of about 25% by weight for the finished product. The product is resistant to organic self-heating during long term dry storage under ambient temperature conditions.

EXAMPLE 3

A sludge cake is first treated with iron sulfate as in the Example 1. Following the blending of this material, the mixture is treated with a calcium carbonate containing material such as a Class C fly ash sufficient to yield a concentration of 4% carbonate in the final fertilizer product. The blending in of this alkaline material will temporarily raise the pH of the mixture to above pH 7.0. The pH should be reduced as soon as possible by adding an acid such as sulfuric or phosphoric acid, to the alkaline material such that the pH of the mixture is reduced to below pH 7.0 and more preferably to between pH 3.0 and pH4.0. This mixture can then be pumped to the pipe cross reactor and reacted with concentrated sulfuric acid and anhydrous ammonia. The mixture is retained in the reactor at this temperature for over 10 seconds before it is discharged into a granulator. The material is granulated in the granulator for over 4 minutes at 205° F. (96° C.). The pH of the mixture is adjusted to pH 6.8 within the granulator by adding additional anhydrous ammonia directly into the granulator. The granular discharge from the granulator is dried in a rotary dryer operating at 200° F. (93° C.) for over 10 minutes to over 98% solids. This process yields a valuable hard granular product made up of 16-1-0-18 (N—P—K—S) fertilizer with a biosolids organic residual of about 25% by weight for the finished product. Due to the added carbonate component this product is resistant to organic self-heating during long term dry storage under ambient temperature conditions.

EXAMPLE 4

A municipal sludge cake of 25% solids is treated with concentrated phosphoric acid sufficient to yield a 5% phosphate component by weight in the finished product. The pH of the mixture is then adjusted with an alkaline material, such as a fly ash containing calcium hydroxide and/or calcium oxide and/or calcium carbonate, or a lime or cement kiln dust, until the pH of said mixture is pH 6.2 to 8.0 and preferably pH 7.2. The mixture is then dried in a sludge drying apparatus, such as a rotary drum dryer, or a fluidized bed dryer, to create a sludge pellet of greater than 90% solids. This dried sludge pellet can then be utilized as an organically-enhanced low grade nitrogen and phosphate fertilizer in commercial agriculture.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

This application discloses numerical range limitations. Persons skilled in the art will recognize that the numerical ranges disclosed inherently support any range within the disclosed numerical ranges even though a precise range limitation is not stated verbatim in the specification because this invention can be practiced throughout the disclosed numerical ranges and at other numerical ranges which persons skilled in the art will find this invention operable.

Other embodiments and uses of the invention will be apparent to those skilled in the art from consideration of the specification and practice of the invention disclosed herein. All references cited herein, including all written publications, all U.S. and foreign patents and patent applications, and all published statutes and standards, are specifically and entirely incorporated by reference. It is intended that the specification and examples be considered exemplary only with the true scope and spirit of the invention indicated by the following claims.

What is claimed is:

1. A method of controlling self-heating in organic-containing materials comprising:
   providing an organic-containing material, having a dryness exceeding 90% by weight, in which pH of the material changes as the material is chemically self-heated; and
   adding a buffer to the organic-containing material to minimize chemical self-heating within the material.

2. The method of claim 1, wherein the organic-containing material is an organically-enhanced inorganic fertilizer.

3. The method of claim 1, wherein the organic-containing material comprises biosolids.

4. The method of claim 1, wherein the organic-containing material comprises granules, pellets, extrusions, grains or particles.

5. The method of claim 1, wherein the organic-containing material is stored for over 14 days.

6. The method of claim 1, wherein organic-containing material comprises an ammonium salt.

7. The method according to claim 1, wherein the buffer comprises a buffering agent selected from the group consisting of mono- and dibasic-phosphate salts, metal carbonates, other carbonates, bicarbonates, phthalates, citrates and mixtures and combinations thereof.

8. The method of claim 1, wherein the organic-containing material has a dryness of or exceeding 95% by weight.

9. The method of claim 1, wherein the amount of buffer is between 0.1 wt. % and 50 wt. % of the dry mass of the total material.

10. The method of claim 1, wherein the pH of organic-containing material after the addition of the buffer is between pH 5.0 and pH 9.0.

11. The method of claim 1, wherein the pH of organic-containing material after the addition of the buffer is between pH 6.0 and pH 8.0.

12. The method of claim 1, wherein the organic-containing material has a dryness of or exceeding 98% by weight.

13. An organically-enhanced inorganic fertilizer, having a dryness exceeding 90% by weight, comprising: an organic component; an inorganic component; and an amount of a buffer effective to prevent self-heating of said fertilizer when stored in bulk for greater than two weeks.

14. The fertilizer of claim 13, wherein the organic component comprises biosolids.

15. The fertilizer of claim 13, wherein the inorganic component comprises an ammonium salt selected from the group consisting of ammonium sulfate, mono-ammonium phosphate, di-ammonium phosphate, ammonium nitrate, urea, and combinations thereof.

16. The fertilizer of claim 13, wherein the buffer is a mono- or dibasic-phosphate salt, metal carbonate, other carbonate, bicarbonate, phthalate, citrates or other organic buffer, or mixtures or combinations thereof.

17. The fertilizer of claim 13, wherein the effective amount is sufficient to prevent unwanted chemical self-heating.

18. The fertilizer of claim 13, wherein the fertilizer stored in bulk is greater than 10 tons.

19. An organically-enhanced inorganic fertilizer comprising: an organic component; an inorganic component; and an amount of a buffer effective to prevent self-heating of said fertilizer when stored in bulk for greater than two weeks, which has a pH when stored that does not vary by more than one pH unit of a pH when manufactured.

20. An organically-enhanced inorganic fertilizer comprising: an organic component; an inorganic component; and an amount of a buffer effective to prevent self-heating of said fertilizer when stored in bulk for greater than two weeks, wherein the organically-enhanced inorganic fertilizer is stored for over 14 days.

21. A method of producing an organically-enhanced inorganic fertilizer, having a dryness exceeding 90% by weight, that is resistant to self-heating comprising:
mixing an organic material with an amount of a phosphate; and
reacting the organic material and phosphate mixture with an acid and a base to produce an organically-enhanced inorganic fertilizer,
wherein the amount of the phosphate is an amount that is effective to prevent self-heating of the organically-enhanced inorganic fertilizer.

22. The method of claim 21, wherein the phosphate is phosphoric acid.

23. The method of claim 21, wherein the acid is sulfuric acid.

24. The method of claim 21, wherein the base is ammonia.

25. A method of producing an organically-enhanced inorganic fertilizer, having a dryness exceeding 90% by weight, that is resistant to self-heating comprising:
reacting an organic material with an acid and a base to produce an organically-enhanced inorganic fertilizer; and
adding an amount of a phosphate to the organically-enhanced inorganic fertilizer,
wherein the amount of the phosphate is an amount that is effective to prevent self-heating of the organically-enhanced inorganic fertilizer.

26. The method of claim 25, wherein the phosphate is phosphoric acid.

27. The method of claim 25, wherein the acid is sulfuric acid.

28. The method of claim 25, wherein the base is ammonia.

29. A method for producing a fertilizer comprising:
providing an organic-containing material, wherein the organic-containing material contains biosolids and ammonium;
combining the organic-containing material with an acid such that the pH of the acid-containing material is less than 6.0;
combining the acid-containing material with an amount of buffer that is effective to enhance the nutrient content of the material; to provide the material with a pH of between about 6 and 8; and to prevent chemical self-heating when stored;
drying the material to produce the fertilizer, and
storing the dried fertilizer wherein the stored fertilizer resists chemical self-heating and does not vary in pH during storage by more than 1 pH unit within a 14 day period.

30. The method of claim 29, wherein the bio-solid material is municipal or industrial waste-water or sludge.

31. The method of claim 29, wherein the acid is a sulfuric acid.

32. The method of claim 29, wherein the ammonium is anhydrous ammonium.

33. The method of claim 29, wherein the material is dried to a dryness of at least 90%.

34. The method of claim 29, wherein dryness is at least 95%.

35. The method of claim 29, wherein dryness is at least 98%.

36. The method of claim 29, wherein dryness is at least 99.5%.

37. The method of claim 29, wherein one or more of a hardening agent, a de-dusting agent, a granulating agent or an odor control agent are combined with the organic-containing material before or after drying.

38. The method of claim 29, further comprising combining the organic-containing material with one or more additional chemicals before or after drying to enhance a nutrient content of the fertilizer.

* * * * *

UNITED STATES PATENT AND TRADEMARK OFFICE
CERTIFICATE OF CORRECTION

PATENT NO. : 7,513,927 B2
APPLICATION NO. : 10/738983
DATED : April 7, 2009
INVENTOR(S) : Ervin L. Faulmann et al.

Page 1 of 1

It is certified that error appears in the above-identified patent and that said Letters Patent is hereby corrected as shown below:

On the title page, after Item No. (65) and prior to Item No. (51), please insert:

--Related U.S. Application Data
(60) Provisional Application No. 60/434,387, filed on December 19, 2002--

In the specification,

Column 1, line 4, prior to the section entitled "Field of the Invention," please insert --This application claims priority to U.S. Provisional Application No. 60/434,387, filed on December 19, 2002, which is specifically and entirely incorporated by reference.--

Signed and Sealed this
Twenty-second Day of March, 2016

Michelle K. Lee
*Director of the United States Patent and Trademark Office*